E. J. FALKINER.
RECEPTACLE FILLING AND MEASURING MACHINE.
APPLICATION FILED JULY 22, 1915.
1,338,429.
Patented Apr. 27, 1920.
2 SHEETS—SHEET 1.
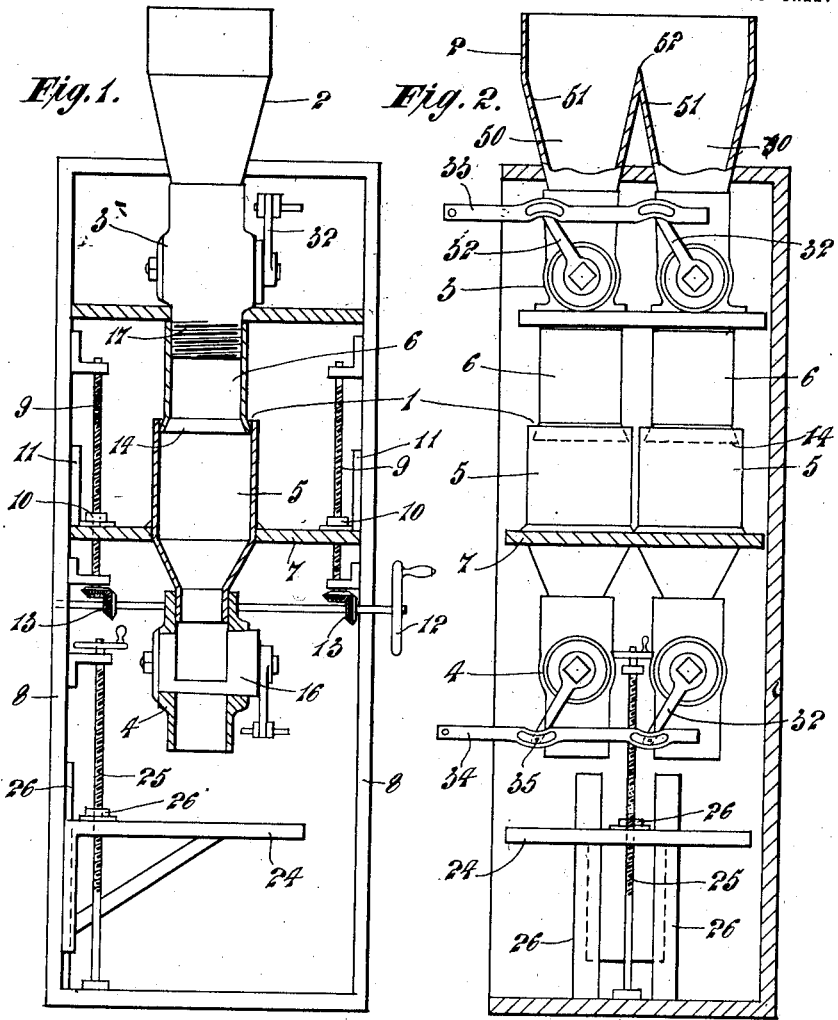
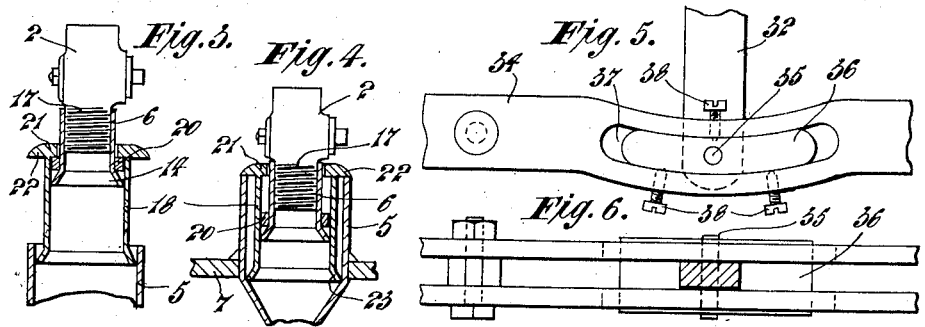
INVENTOR:
Edward John Falkiner
BY
ATTORNEY E. J. FALKINER.
RECEPTACLE FILLING AND MEASURING MACHINE.
APPLICATION FILED JULY 22, 1915.

1,338,429.

Patented Apr. 27, 1920.
2 SHEETS—SHEET 2.

INVENTOR:
Edward John Falkiner
BY: Hans Oldenmal
ATTORNEY.

UNITED STATES PATENT OFFICE.

EDWARD J. FALKINER, OF WELLINGTON, NEW ZEALAND.

RECEPTACLE FILLING AND MEASURING MACHINE.

1,338,429.  Specification of Letters Patent.  Patented Apr. 27, 1920.

Application filed July 22, 1915. Serial No. 41,282.

*To all whom it may concern:*

Be it known that I, EDWARD JOHN FALKINER, a subject of His Majesty the King of Great Britain and Ireland, residing at No. 23 Waterloo avenue, in the city of Wellington, in the Dominion of New Zealand, have invented a new and useful Improvement in Receptacle Filling and Measuring Machines; and I do hereby declare the following to be a full, clear, and exact description of the same.

This invention relates to apparatus for filling receptacles with pulverulent or discrete materials.

The object of the invention is to construct an apparatus that will be simple and by means of which the same quantity of material will pass to each receptacle.

Measuring devices adapted to contain any desired quantity of material are mounted upon a slidable frame. The raising or lowering of this frame adjusts the capacity of the measuring vessels.

The discrete material is led into the measuring vessels, and thence through suitable taps or cocks into receptacles. The taps are controlled by a common lever, or, if desired, may be operated independently.

The material is fed into a hopper of special construction, thence into the measuring vessels.

The measuring devices comprise two or more vessels adapted to telescope within each other. When the slidable frame is raised to its highest position the measuring vessels will contain the minimum quantity of material, and as the frame is lowered the holding capacity of the vessels will increase proportionately until the maximum is reached. The vessels are thereby adjustable to the required holding capacity and held in that position.

The discharge openings of the measuring devices are controlled by taps or cocks of special construction, the plugs of which have their arms attached to a common operating member, or the taps may be operated independently.

The invention is described in detail by means of the accompanying drawings, the same figures of reference indicate as far as possible the same parts throughout and the novel features thereof are pointed out in the claims.

On the drawings:—

Figure 1 is an elevation partly in section of a machine for filling receptacles with pulverulent or discrete materials.

Fig. 2 is a side elevation thereof.

Fig. 3 is a sectional view of a measuring device in its maximum extended position.

Fig. 4 is a similar view of the measuring device collapsed.

Fig. 5 is a side view of a plug arm adjusting device.

Fig. 6 is a plan thereof.

Figure 7:
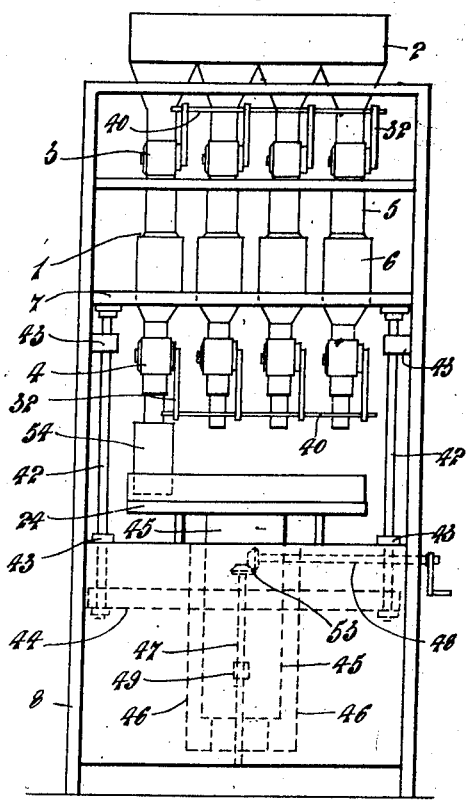
Fig. 7 is a front view of a machine having a plurality of filling devices.

Referring to the drawings the machine consists generally of measuring devices 1, hoppers 2, taps 3, intermediate between the hoppers 2 and measuring devices 1 and taps 4 controlling the delivery ends of the measuring devices.

The measuring devices comprise vessels 5 and 6 preferably of glass.

The vessels 5 are mounted in a frame 7 slidable within the framing 8 of the machine. This frame 7 is operable by any suitable means and in Fig. 1, threaded spindles 9 pass through nuts 10 fixed upon the frame 7 and are operated by a wheel 12 and bevel gearing 13. The frame 7 is suitably guided in the framing 8 by guide 11 fixed to the frame 7.

Depending into the vessels 5 are the cylindrical walls or vessels 6 and preferably provided with flaring mouths 14 as shown.

The vessels 5 have their lower or delivery ends fitted into the taps 4 hereinafter to be fully described. The plugs 16 of these taps form the bottom of the measuring chamber (see Fig. 1).

The vessels 6 are threaded upon the lower or discharge ends 17 of the taps 3 and are adjustable thereon by means of the threads.

In Figs. 3 and 4 is shown a measuring device having three vessels or collapsible walls the third vessel or wall 18 telescoping within the vessel 5 and the vessel 6 telescoping within the vessel 18. When the sliding frame 7 is raised to its highest position as indicated in Fig. 4 the vessels are collapsed and the holding capacity of the device will then be at the minimum.

In order to insure that each measuring device will contain the exact volume the vessels 6 are adjusted upon the threaded ends 17 of the taps 3. When all the devices are so adjusted thereupon, the frame 7 being lowered, the capacity of all the devices will increase in the same ratio.

When the frame is lowered to its lowest position the internal volume of the devices will be at its maximum as shown in Figs. 1 and 3.

In the construction of the device shown in Figs. 3 and 4 the vessel 6 is provided with an external annular ring 20 integral with or fixed to the said vessel.

The top of the vessel 18 has an annular flange 21 projecting inward and adapted to engage over the ring 20 whereby the vessel 18 is supported when the device is expanded as shown in Fig. 3. When the device is collapsed an external extension 22 of the flange 21 forms an abutment for the upper edge of the vessel 5 as clearly shown in Fig. 4.

The bottom edge of the vessel 18 may also be provided with a flared mouth 23.

An adjustable platform 24 upon which the receptacles to be filled are placed is adjustable by means of a threaded spindle 25 passing through a nut 26 fixed to the platform 24.

The platform is suitably guided in the framing 8 by guides 26.

Figure 10:
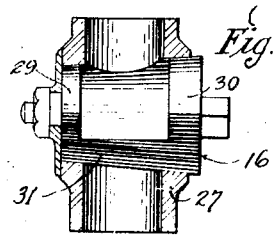
Fig. 10 is a longitudinal section of a tap employed.
Figure 11:
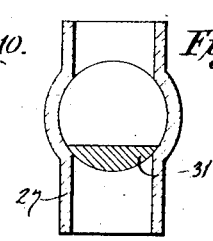
Fig. 11 is a cross section thereof.

The taps 3 and 4 comprise casings 27 (see Figs. 10 and 11) and plugs 16 consisting of disk ends or flanges 29 and 30 connected together by a web 31 which is sufficient to close the discharge opening of the tap as clearly shown in Fig. 11 but when the plug is rotated a free passage is allowed through the casing 27 without diminishing the internal holding capacity of the casing or entrapping material within the plug.

The plugs of the taps 3 are connected through the intervention of arms 32 to a common operating member 33 and the plugs of the taps 4 similarly connected to a common member 34. The ends of the members 32 remote from the plugs are pivoted upon pins 35 (see Figs. 5 and 6) in blocks 36 adjustable in arcuate slots 37 provided in the operating members 33 and 34.

Set pins 38 in the members 33 and 34 secure the blocks 36 in the desired position in the radial slots. By means of this arrangement the blocks 36 may be so adjusted that the opening and closing of the taps connected to a common operating member is synchronous.

In Fig. 7 is shown a machine in which there is a plurality of common operating members having a plurality of taps attached to each member, the taps in front only being shown.

The sets of operating members are in this case fastened together by means of a rod 40 thus enabling the whole of the taps to be operated at once. The rod 40 may, however, be dispensed with and each set of operating members with their accompanying taps operated separately.

The sliding frame 7 carrying the measuring devices is attached to pillars 42 slidable in guides 43 the lower ends of the pillars being fixed to a frame 44 which is raised and lowered by suitable rack gearing not shown, such as the gearing shown in Figs. 1 and 2.

The platform 24 has a vertical member 45 slidable in suitable guides 46 and operated by means of a threaded spindle 47 passing through a nut 49 fixed to the vertical member 45 and operated by bevel gearing 53 and cranked spindle 48.

Figure 8:
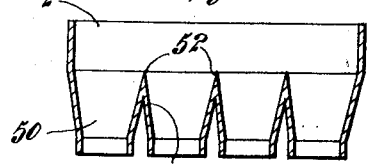
Fig. 8 is a sectional view.
Figure 9:
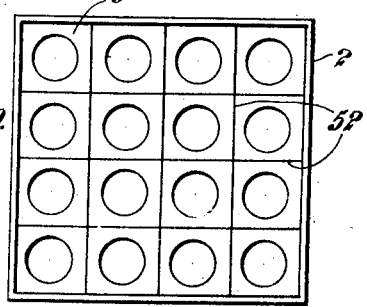
Fig. 9 is a plan of a hopper.

The hopper is illustrated in Figs. 8 and 9. The lower portion of the hopper 2 is provided with a plurality of hopper shaped openings 50 which form secondary hoppers.

The sides 51 of these secondary hoppers are precipitous in order not to allow any material no matter how fine to adhere to them.

The junctions of the secondary hoppers form continuous lines as shown in Fig. 9, that is, the tops of the openings are rectangular. The edges 52 where the secondary hoppers converge are acute whereby lodgment of the material thereon is prevented.

The sides of the main hopper merge precipitously into the sides of the secondary hoppers at all points.

Material fed into the main hopper will be divided or separated by the acute edges 52 and be deposited into the secondary hoppers in equal proportions.

The hoppers shown in Figs. 1 and 2 are also of this class.

In operation the taps 3 are operated to allow material to flow from the hoppers 2 into the measuring devices.

Upon the said devices being filled the taps 3 are turned off and then the taps 4 operated to allow the contents of the devices 1 to flow into receptacles 54 placed upon the platform 24 and disposed beneath the delivery ends of the taps 4.

What I claim is:—

1. A machine of the class described, in combination, adjustable telescopic measuring devices, supply vessels, taps on the outlet ends of said supply vessels, cylindrical walls forming the upper parts of said measuring devices threaded upon the outlet ends of said taps for fine adjustment of the capacity of the measuring devices, the lower ends of said cylindrical walls having conically flared rims, said rims fitting the lower parts of said measuring devices, and taps controlling the outlet of the lowermost parts of said measuring devices, substantially as set forth.

2. A machine of the class described, in combination, supply vessels, telescopic measuring devices, sets of taps on the outlet ends of said supply vessels, cylindrical walls forming the upper parts of said telescopic measuring devices and threaded upon the outlet ends of said taps, an annular ring upon said cylindrical wall, an intermediate cylindrical wall depending from and supported by said ring, a wall forming the lower portion of said measuring device, into which said intermediate wall telescopes, both the first and intermediate walls having conically flared lower ends, and sets of taps controlling the discharge from the measuring devices, substantially as set forth.

3. In a machine of the class described, measuring vessels, sets of taps controlling the inlets to and delivery from said measuring vessels, operating arms one for each tap, a common operating member for controlling a set of taps, and means in said member for adjusting the plugs of the taps whereby they will open and close uniformly, substantially as described.

4. In a machine of the class described, measuring chambers, sets of taps controlling the inlets to and delivery from said measuring chambers, operating arms one for each tap, a common operating member for controlling a set of said taps and having arcuate slots, blocks adjustable in said slots, the arms of the taps being pivoted in said blocks, and means for adjusting said blocks in said slots, substantially as described.

5. A machine of the class described, in combination, adjustable telescopic measuring devices collapsible one within the other, supply vessels, sets of taps controlling the inlets and outlets from the measuring vessels, operating arms one for each tap, a common operating member for controlling a set of said taps and having arcuate slots, blocks adjustable in said slots, the arms of said taps being pivoted to the blocks, and means for securing said blocks in said slots, substantially as set forth.

In testimony whereof, I have signed my name to this specification in the presence of two subscribing witnesses.

E. J. FALKINER.

Witnesses:
EDMOND P. O'DONNELL,
SYDNEY H. HIGGS.